A. R. GROFF.
AUXILIARY SPRING ATTACHMENT.
APPLICATION FILED JULY 15, 1920.
1,385,993.
Patented Aug. 2, 1921.
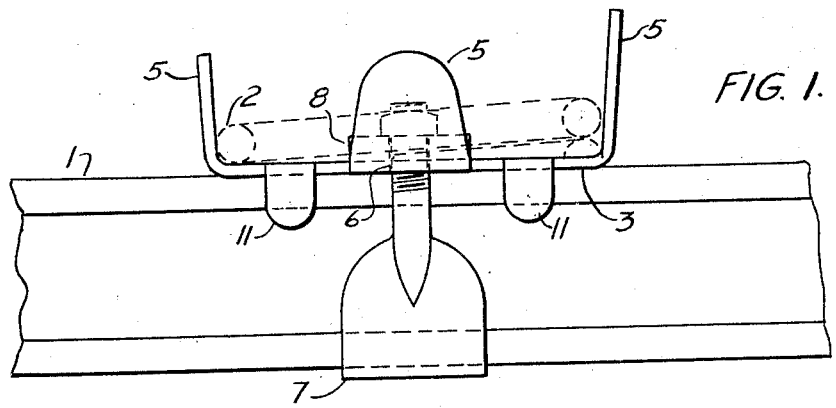
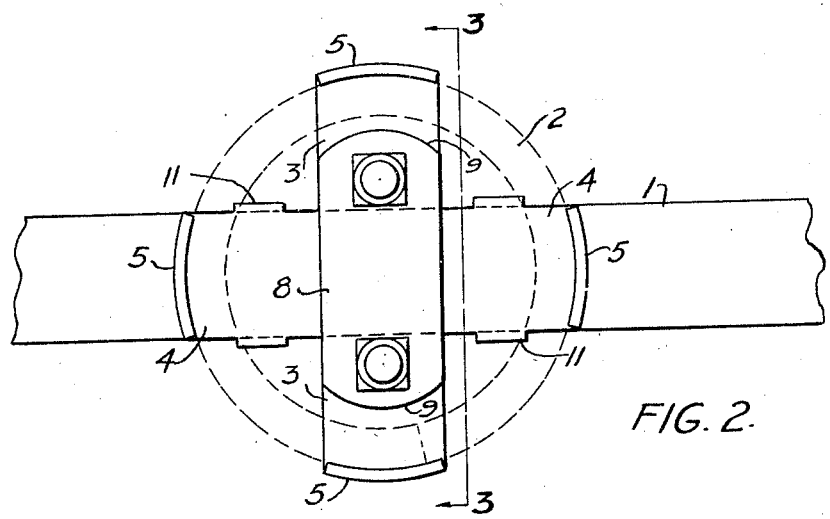
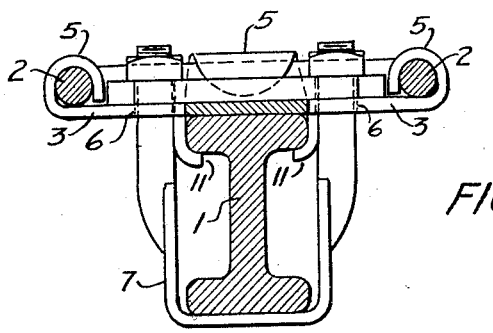
INVENTOR
A. R. Groff
BY
ATTORNEY

UNITED STATES PATENT OFFICE.

ANGUS R. GROFF, OF BIRMINGHAM, ALABAMA.

AUXILIARY-SPRING ATTACHMENT.

1,385,993.  Specification of Letters Patent.  Patented Aug. 2, 1921.

Application filed July 15, 1920. Serial No. 396,411.

*To all whom it may concern:*

Be it known that I, ANGUS R. GROFF, a citizen of the United States of America, residing at Birmingham, in the county of Jefferson and State of Alabama, have invented certain new and useful Improvements in Auxiliary-Spring Attachments, of which the following is a specification.

My invention relates to a means for attaching to an axle an auxiliary spring such as forms the subject matter of my pending application Serial No. 277,999, dated February 19th, 1919, and in effect this application constitutes the continuation of my pending application aforesaid.

The object of my present invention is to design a bottom attaching plate for the auxiliary spring which can be readily attached to the spring and to the axle, a single clip and bendable lugs on the plate being the means used to hold it fixedly in its proper adjusted position on the axle.

A further object is to form the plate proper of relatively light stamped metal and to reinforce it by a center clip yoke of heavy steel which also serves as a centering element for the bottom coil of the auxiliary spring.

A further object is to shape the spring engaging lips on the plate so that their bases conform to and fit snugly about the bottom coil of the spring and with the clip yoke hold it positively in centered position, one of the lips being extended so as to embrace the double thickness of the coil which occurs opposite the end of the bottom coil.

My invention will be better understood by reference to the accompanying drawings which form a part of this specification, and in which:—

Figure 1 is a side view of an axle with the spring plate applied prior to bending the plate lugs about the axle flange and spring, the bottom coils of the spring being shown in dotted lines.

Fig. 2 is a plan view of Fig. 1.

Fig. 3 is a sectional view on the line 3—3 of Fig. 2, the bottom coil of the spring in this view being shown in full lines.

Similar reference numerals refer to similar parts throughout the drawings.

I have shown my invention adapted for application to an axle 1, such as is in general use and which has a cross section of I-beam character. The base plate for attaching the spring 2 to the axle is preferably formed of stamped metal provided with four equi-distantly spaced extensions 3 and 4, the extensions 3 being oppositely disposed and similar to each other and the extensions 4 being oppositely disposed at right angles to the extensions 3 and similar. Each of the extensions is provided at its free end with a lip 5 and all of the lips are of the same length except that one on extension 4 is elongated to embrace the double lapped portions of the spring which come opposite the end of its bottom coil, as seen in Fig. 1. The lips are long enough to bend far enough over the bottom coil of the spring to anchor it on the plate. Each extension 3 is provided with a bolt hole 6 and a clip 7, adapted to embrace the axle 1, has threaded ends inserted upwardly through the holes 6 and through alining holes in a clip yoke 8 formed of heavy steel having its ends 9 rounded and spaced, relatively to the lips 5 on the extensions 3, to leave just sufficient room for the bottom spring coil to be seated on the plate between said lips and yoke. The yoke thus serves as a centering element for the spring. Nuts serve to secure the clip yoke and base plate securely in the desired position on the axle, and having thus been secured and the spring having been properly positioned with the lapped portions of its bottom coil opposite the longer lip 5, the several lips 5 are bent over and about the bottom coil of the spring, any suitable mechanism or tool being available for this purpose. When the lips have all been bent about the spring the latter is firmly and positively centered on and attached to the base plate. The base plate is designed to prevent any lateral twisting on the axle by the provision on its extensions 3 of opposite pairs of lugs 11 which are adapted to be bent around the edges of the top flange of the axle. The clip yoke serves to substantially reinforce the extensions 3 and enables the base plate to be made up of lighter stock, as its reinforcing yoke is of a heavy steel plate. When thus assembled the spring has a rigid connection to the base plate and the base plate has a rigid connection to the axle, all being obtained by the bending of the lips and lugs as described and the use of the single clip. This assures a very strong, light and inexpensive attachment which can be applied without machine work on the axle and without skilled labor or shop work.

This invention is not intended to be restricted in scope to the preferred embodiment shown, but contemplates such modifications as come within the spirit and scope of the claims.

Having thus described my invention, what I claim as new and desire to secure by Letters Patent, is:—

1. An attaching plate for auxiliary springs having at opposite ends downwardly bendable lugs adapted to engage the plate support, upturned inwardly bendable lugs adapted to center and interlock with the bottom coil of a spring, and a clip connected to the overhung sides of the plate midway between its first mentioned lugs.

2. An attaching plate for auxiliary springs having at opposite ends downwardly bendable lugs adapted to engage the plate support, upturned inwardly bendable lugs adapted to center and interlock with the bottom coil of a spring, a clip connected to the overhung sides of the plate midway between its first mentioned lugs, and a heavy metal yoke for the clip disposed transversely to the downwardly bendable lugs and adapted to reinforce said overhung sides of the plate.

3. An attaching plate for auxiliary springs having at opposite ends downwardly bendable lugs adapted to engage the plate support, upturned inwardly bendable lugs adapted to center and interlock with the bottom coil of a spring, a clip connected to the overhung sides of the plates midway between its first mentioned lugs, and a heavy metal yoke for the clip disposed transversely to the downwardly bendable lugs and adapted to reinforce said overhung sides of the plate, said yoke having its ends rounded to fit snugly as a centering block in the bottom spring coil.

4. The combination with a vehicle axle having a top flange, of a base plate for an auxiliary spring having extensions overlying the axle, lugs on said extensions adapted to be bent over and interlock with the edges of the axle's top flange, means to fasten the center of the plate to the axle, and side extensions on the base plate at right angles to the axle, the tops of all such extensions being upturned and adapted to be bent over and positively engage the base coil of a spring thereon.

5. A base plate adapted to attach an auxiliary spring to an axle comprising a body formed of bendable sheet metal having pairs of end and side extensions, lugs on the opposite end extensions adapted to be bent over and interlocked with an axle, a clip yoke set transversely across the center of the body with its ends reinforcing the side extensions, a clip adapted to straddle the axle and fasten through the side extensions to the yoke, and upturned lugs on the several extensions adapted to be bent over the base coil of a spring.

6. A base plate adapted to attach an auxiliary spring to an axle comprising a body formed of bendable sheet metal having pairs of end and side extensions, lugs on the opposite end extensions adapted to be bent over and interlocked with an axle, a clip yoke set transversely across the center of the body with its ends reinforcing the side extensions, a clip adapted to straddle the axle and fasten through the side extensions of the yoke, and upturned lugs on the several extensions adapted to be bent over the base coil of a spring, one extension being longer to bend over the double coil thickness where the end laps the bottom coil.

7. A base plate formed of bendable sheet metal in the form of a cross with upturned spring engaging lugs on its ends and spaced pairs of axle engaging lugs, a clip connected to the plate ends overhung at each side from the axle and disposed midway between and at right angles to the plane of the axle engaging lugs, and a heavy metal clip yoke overlying the overhung plate ends, said spring engaging lugs being adapted to receive the base coil of a spring snugly between them and to be bent upwardly over said coil to secure it to the plate and said clip forming a diagonal centering block for said base coil, substantially as described.

In testimony whereof I affix my signature.

ANGUS R. GROFF

Witness:
NOMIE WELSH.